March 16, 1948.  F. P. WILLCOX  2,437,774
DIRECT READING PHOTOELECTRIC EXPOSURE METER
Filed Dec. 16, 1944
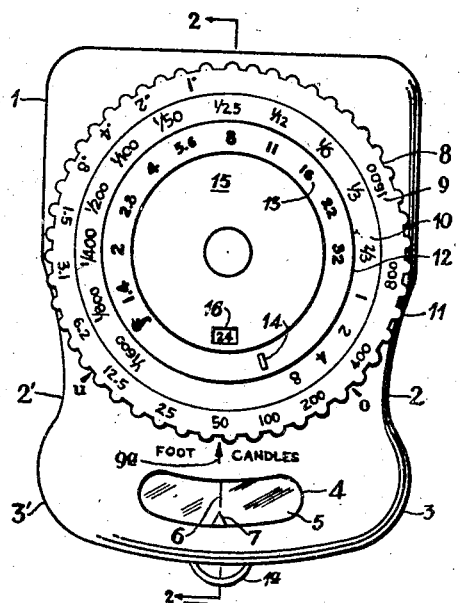

Patented Mar. 16, 1948

2,437,774

UNITED STATES PATENT OFFICE 2,437,774

DIRECT READING PHOTOELECTRIC EXPOSURE METER

Frederick P. Willcox, Arlington, Va.

Application December 16, 1944, Serial No. 568,429

7 Claims. (Cl. 88—23)

This invention relates to photoelectric exposure meters, more particularly to improvements therein to provide single hand operation, including operation of the calculating dials, and to provide direct reading of exposure values. By "direct reading," I mean the reading of exposure times and diaphragm openings without the necessity for a mental transfer or calculation of a light value reading, as from a meter scale to a calculator disc.

Most of the photoelectric exposure meters known to the art operate on one or the other of two general systems. In the first system, the photoelectric current causes deflection of a meter pointer along a scale which is marked directly in exposure times, such as $\frac{1}{25}$, $\frac{1}{50}$, etc. Such a meter requires the use of one hand only, since it need only be pointed at the scene to be photographed, and the required exposure read off the scale. However, such a meter is direct reading for only one value of diaphragm opening and emulsion sensitivity, which seriously limits the usefulness of this type of meter.

In the second common type of exposure meter, the indicating needle of the meter plays over a scale of light values (usually foot-candels or other units), and the reading of such needle is then made the subject of a calculation carried out with the aid of calculator discs mounted upon the meter. This type of instrument is much more flexible than that previously described, but it also has several disadvantages. Among these are the necessity for memorizing the light value reading in order to transfer it to the calculator, which may introduce personal errors, and the need to utilize both hands, since the body of the meter must be held in one hand while the calculator discs are adjusted with the other. Moreover, the time required for these operations is such that under certain conditions the illumination of the scene may have changed substantially before the exposure can be determined. In addition, the small crowded scale of light values which it is possible to apply to such a meter is not conducive to accurate reading.

A further serious objection to the majority of prior art meters is that the determination of exposure by the highlight and shadow method requires two separate adjustments of the meter and a mental averaging of the results, which is cumbersome, time-consuming and often inaccurately accomplished.

A still further serious objection to prior art meters is found in their inability to handle, with reasonable accuracy, the required range of illumination values. This is because, to permit the light values to extend from the minimum to the maximum brightness likely to be encountered, and still maintain the scale length within permissible dimensions, said scale was necessarily quite crowded. To overcome this crowding (which simply went uncorrected in the more primitive meters), various expedients were adopted, each having one or more corollary disadvantages. For example, mechanical masking of the sensitive cell invariably resulted in undesirable changes in the acceptance angles. On the other hand, use of a series resistor and shorting switch involved a double scale, and both of these systems required added manual and mental manipulations. Other expedients involved the same or different disadvantages, as is well known to the art.

It is an object of my invention to provide a photoelectric exposure meter which overcomes all of the above noted objections. In particular, it is an object of my invention to provide a meter which can be held in one hand throughout the entire operation of determining exposure, which is direct-reading and therefore does not involve the memorizing and transfer of indications from one part to another (except, of course, when used for the highlight and shadow method), and which, while relatively simple in construction and use, yet provides facilities for determining the proper exposure for various special conditions of camera operation, either by the single-reading method or by the highlight and shadow method.

It is a further object of my invention to provide a photoelectric exposure meter in which the single dial that is adjusted in accordance with the light value is especially designed for easy manipulation by the thumb of the hand which holds the meter, and this without subjecting said dial to danger of breakage, such as would be the case if said dial were merely extended beyond the periphery of the body of the meter.

It is a further object of my invention to accomplish all of these desirable results with a meter of such wide adjustment range and sensitivity that neither scale-changing devices nor multiple scales are required to cover the entire range of illuminations ordinarily encountered in camera work.

These and other objects of my invention will be best understood in connection with a single specific embodiment thereof described below, reference being had to the accompanying drawings, of which Figure 1 is a plan view of an exposure meter constructed in accordance with my invention, Figure 2 is a sectional view thereof taken along the line 2—2 of Figure 1, Figure 3 is a diagrammatic view of certain of the internal parts, and Figure 4 is a wiring diagram of the connections between the electrical elements.

Referring now to Figure 1 of the drawings, numeral 1 designates the case of the exposure meter, which is provided with narrowed portions 2, 2' on opposite longitudinal sides thereof, and with rounded rear corners 3, 3'. In the top of the case 1, near the rear end, is an arcuate window 4, fitted with a transparent pane 5. Visible through this window is the meter needle 6 and a fiducial mark 7, the arrangement of which will be explained in greater detail below. A ring 1a for attaching a neck cord or the like, may be secured to case 1 at its rearward edge.

Mounted upon case 1 are the calculating discs 8, 12 and 15, discs 8 and 12 being arranged for rotational movement about their common center, and disc 15 being relatively fixed with respect to case 1.

It will be seen from Figure 1 that outer disc 8 has a serrated, up-turned periphery 11, which extends just to the edge of case 1 at a point within each of the narrowed portions 2, 2'. This construction enables the user to adjust disc 8 by means of the thumb of the hand which holds the meter, since the heel of the thumb will lie along one of the narrow portions 2, 2', with the fingers of the same hand obtaining a firm grasp of the meter by virtue of the other of the two narrowed portions. The narrowed portions 2, 2' hence permit a positive grip of the instrument, regardless of the pressure with which it is held in the hand.

Disc 8 carries two concentric scales, a scale 9 of illumination values (foot-candles), and within that scale, a scale 10 of shutter speeds. Scale 9 cooperates with a fiducial mark 9a upon case 1. Scale 10, however, cooperates with a scale 13 of diaphragm openings (f-stops) carried by disc 12, which latter disc is relatively fixed in that it retains its position when disc 8 is adjusted, but which can be rotated by applying force to a struck-up finger 14. Innermost disc 15 is fixed with respect to case 1, but has a cut-out 16 through which is visible a selected one of a series of film speed indications carried by underlying disc 12.

I have found that it is advantageous to mark scales 10 and 13 upon their respective discs 8 and 12 in such a way as to provide a high visibility, for example by using white or bright numbers upon a dull background; I make scale 9, however, of relatively lower contrast with respect to its background. The purpose of this arrangement is to emphasize the most commonly read scales 10 and 13, to avoid confusing the operator with a multiplicity of scales all having the same visibility.

Referring now to Figure 2 of the drawings, case 1 is shown as having one end closed by a transparent plate 17 provided with lenticulations to restrict the acceptance angle of the meter, as is well known. Behind this plate is the photosensitive plate 18, separated from plate 17 by a baffle structure 19. Mounted within case 1 is an arcuately shaped resistor 20, contacted by a sliding conductor arm 20', mounted so as to rotate with disc 8. This is accomplished by fixing said arm to a bushing 21 whose outer end carries the disc 8, and whose inner end carries a cam 21'. As shown in Figure 3, this cam cooperates with a cam follower arm 22 which is integral with a fan-shaped member 23 consisting of two arms 24, 24' carrying arcuate portions 25 and 26, the latter of which bears the pointed fiducial member 7 near its center.

A shaft 28 passing through bushing 21 is fixedly mounted with respect to case 1, and serves to secure disc 15 against rotation.

Within case 1 is also mounted the usual meter element 29, provided with the moving pointer 6. Meter 29 is so arranged that the end of pointer 6 travels in a path just below window 4. The arm 22 is pivotally mounted as by a bearing 30, and is so nearly coaxial with the pointer 6 that its outer end, and fiducial member 7, travel nearly parallel over their normal movement range. A spring 31 serves to maintain arm 22 in contact with cam 21'.

A background member 32 mounted within case 1 serves to render move visible, through window 4, the pointer 6 and mark 7.

Meter element 29 may be provided with the usual adjusting screw 33 for adjusting the zero position of pointer 6, and this may be made accessible from outside the case by removal of plug 34 located in an opening in case 1 just behind said screw.

The operation of my exposure meter is very simple. First, the user adjusts disc 12, by means of projection 14, so that the emulsion speed which shows through window 16 corresponds to the film which he intends to use. He then aims the meter at the object or scene to be photographed, and by means of the thumb of that hand which holds the meter, he adjusts disc 8 to a point which just brings needle 6 into alignment with mark 7. When this has been done, the proper exposure (shutter speed) for any desired diaphragm opening may be read directly from scale 10, against the diaphragm markings of scale 13 on disc 12. All combinations of diaphragm openings and shutter speeds which will give a correct exposure are obtained with the one adjustment.

If the user desires to make an exposure based upon the highlight and shadow illuminations from the scene, he may make two separate measurements of such illuminations by reading their respective light values on scale 9 against pointer mark 9a, and then set disc 8 so that these two values are on opposite sides of mark 9a and separated therefrom by equal angles. The exposure data may then be read as before from scales 10 and 13, and the user may also read opposite marks "u" and "o" on case 1, the light values beyond which the film can be expected to be under and over exposed, respectively, as is well known in the art.

It will be observed from Figure 3 that low values of illumination correspond to more clockwise positions of needle 6, and that under such conditions the resistance in series with the photoelectric cell and meter should be low. When high values of illumination are encountered, the end of needle 6 swings to the right in Figure 3, and to align the needle with mark 7, disc 8 is turned clockwise. This does two things: it increases the series resistance (see Figure 4) to reduce the needle deflection, and it moves mark 7 to the right in Figure 3. These two effects combine to maintain alignment between the needle and the mark in a readable position beneath window 4, and greatly increase the range of brightness values over which the instrument is direct reading. The presence of cam 21 in the mechanical linkage enables a fairly uniform division of all the scales, without requiring special shaping of the pole pieces of meter element 29, an expensive operation required by certain prior-art constructions.

I have described herein a particular specific embodiment of my invention, but it is to be understood that there is considerable latitude in the design of mechanisms coming within the spirit of my invention. Hence, although specific terms have been employed, they are used in a generic and descriptive sense and not for purposes of limitation.

I claim:

1. In a photoelectric exposure meter, a light sensitive cell, a meter connected to said cell and having a pivoted indicating needle, a continuously variable resistor connected to said meter and said cell, an indicia-bearing element arranged to adjust said variable resistor, a member pivotally mounted upon an axis substantially parallel to the pivotal axis of said needle and bearing a fiducial mark arranged for movement contiguous to the path of said needle to permit alignment of the needle and mark, and a continuous motion-transmitting connection between said member and said element, said connection being so arranged that movement of said element in a direction to reduce the resistance of said variable resistor causes a concomitant movement of said member in that direction of needle movement corresponding to a reduction in energization of said cell.

2. In a photoelectric exposure meter, a light sensitive cell, a meter connected to said cell and having a pivoted indicating needle, a continuous variable resistor connected to said meter and said cell, a movable indicia-bearing element arranged to adjust said resistor continuously throughout the range of movement of said element, and a pivotally mounted member bearing a fiducial mark and arranged for movement contiguous to the path of said needle, and means continuously connecting said member for movement under the control of said element, the pivotal axes of said needle and said member being substantially parallel and so nearly coincidental as to provide substantial parallelism between the paths of said needle and of said fiducial mark over a wide range of movement of the latter.

3. In a photoelectric exposure meter, a light sensitive cell, a meter connected to said cell and having an indicating needle, a continuously variable resistor connected to said meter and said cell, a manually operable indicia-bearing element arranged to adjust said variable resistor, a member bearing a fiducial mark and mounted for movement contiguous to the path of said needle to permit alignment of the needle and mark, and a continuous motion-transmitting connection between said member and said element, whereby movement of said element at any point in its travel operates both to adjust said resistor and to adjust the position of said mark.

4. In a photoelectric exposure meter of the type comprising a light sensitive cell, a meter connected to said cell and having an indicating pointer, a continuously variable resistor connected to said meter and said cell, and a manually movable indicia bearing element connected to said resistor for adjustment of the latter throughout the range of movement of said element, the improvement which comprises a member bearing a fiducial mark mounted for movement contiguous to the path of said pointer, and means continuously connecting said member and said element for movement of the former under control of the latter throughout the range of adjustment of said element, to permit alignment of said pointer and said mark.

5. In an exposure meter for photographic purposes, a photoelectric cell, a galvanometer connected to said cell and provided with an indicator movable in response to energization of said cell, a continuously variable resistor in circuit with said cell and said galvanometer, a manually operable dial connected with said resistor to adjust the same continuously throughout the range of operation of said dial and thereby continuously to alter the sensitivity of said meter, a member movable along the path of said indicator and bearing a fiducial mark, and a continuously engaged motion-transmitting connection between said member and said dial, whereby the positions of said indicator and said mark are both continuously under the influence of the adjustment of said dial.

6. In a photographic exposure meter of the type having a casing, a light sensitive cell, and an electric meter connected with said cell and provided with a movable indicator, the combination of a member continuously adjustable to vary the indication of said electric meter independently of the value of illumination entering said casing, a manually operable indicia-bearing dial continuously connected to said member for adjustment of the latter throughout the range of adjustment of said member, an element bearing a fiducial mark mounted for movement contiguous to the path of said indicator to permit alignment of said indicator and said mark, and a continuously engaged motion-transmitting connection between said element and said dial, whereby the positions of both said indicator and said mark are continuously under the influence of the position of said dial.

7. In a photographic exposure meter, a windowed casing, a light sensitive cell mounted in said casing for illumination through said window, an electric meter connected with said cell and provided with a rotatable pointer, a member continuously adjustable to vary the indication of said electric meter independently of the value of illumination entering through said window, a manually operable dial bearing indicia of exposure factors mounted on said casing and continuously connected to said member for adjustment of the latter throughout the range of operation of said dial, an element bearing a fiducial mark mounted for pivotal movement contiguous to the path of said pointer to permit alignment of said pointer and said mark, and a continuously engaged motion-transmitting connection between said element and said dial, whereby the positions of both said pointer and said mark are continuously under the influence of the position of said dial.

FREDERICK P. WILLCOX.

REFERENCES CITED

The following references are of record in the file of this patent:

UNITED STATES PATENTS

| Number | Name | Date |
| --- | --- | --- |
| 1,144,142 | Lupton | June 22, 1915 |
| 1,895,271 | Tonnies | Jan. 24, 1933 |
| 2,048,655 | Hineline | July 21, 1936 |
| 2,070,664 | Kuppenbender | Feb. 16, 1937 |
| 2,091,464 | Kuppenbender | Aug. 31, 1937 |
| 2,178,197 | Bing | Oct. 31, 1939 |
| 2,199,464 | Kuppenbender | May 7, 1940 |
| 2,268,105 | Bing | Dec. 30, 1941 |
| 2,287,430 | Kende et al. | June 23, 1942 |
| 2,387,466 | Rath | Oct. 23, 1945 |

FOREIGN PATENTS

| Number | Country | Date |
| --- | --- | --- |
| 458,546 | Great Britain | Dec. 23, 1936 |